July 16, 1940.  J. R. ALBERS  2,207,964
WIND DRIVEN POWER APPARATUS
Filed March 17, 1938  2 Sheets-Sheet 1
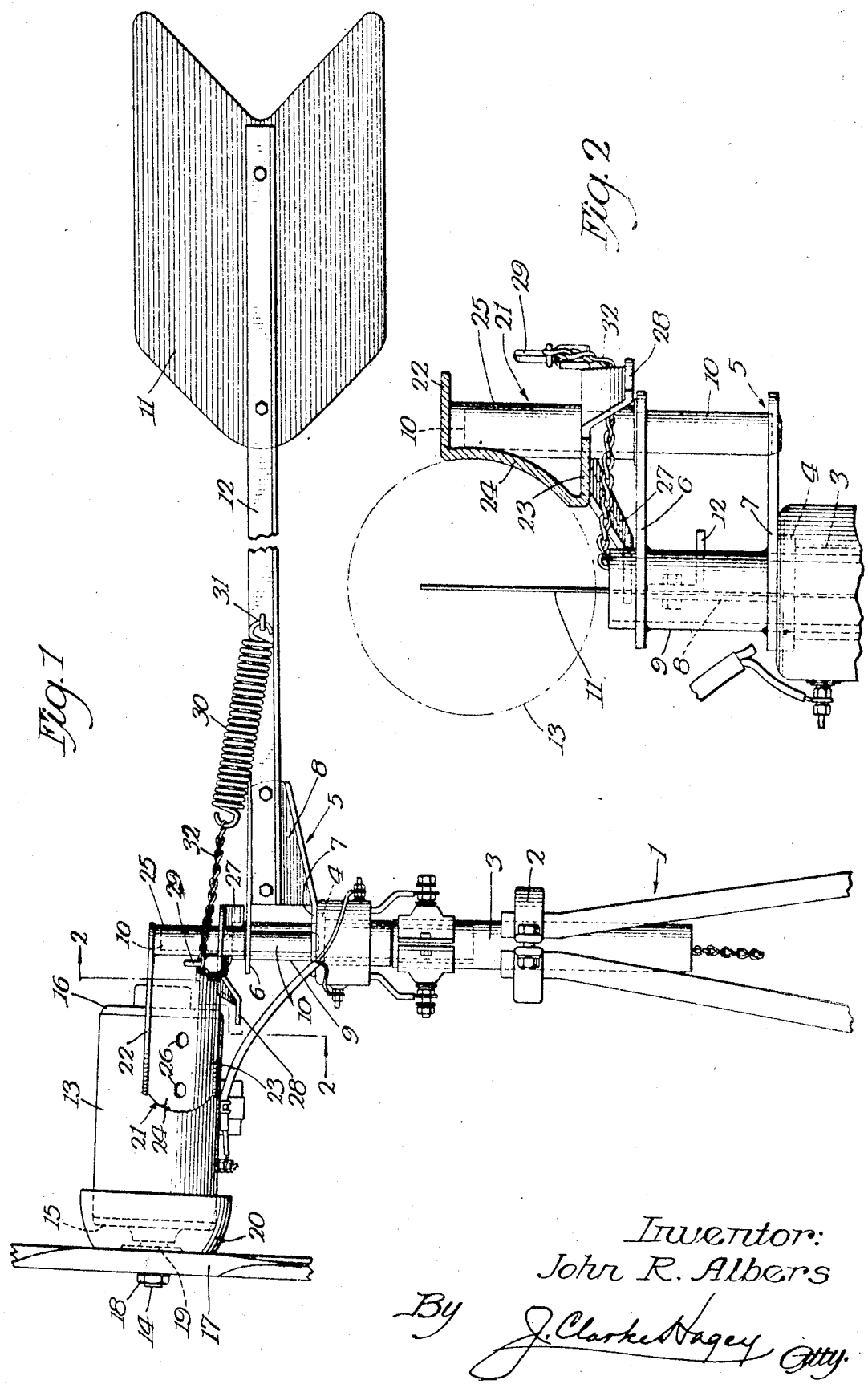
Inventor:
John R. Albers
By J. Clarke Hagey, Atty.

July 16, 1940.  J. R. ALBERS  2,207,964
WIND DRIVEN POWER APPARATUS
Filed March 17, 1938   2 Sheets-Sheet 2
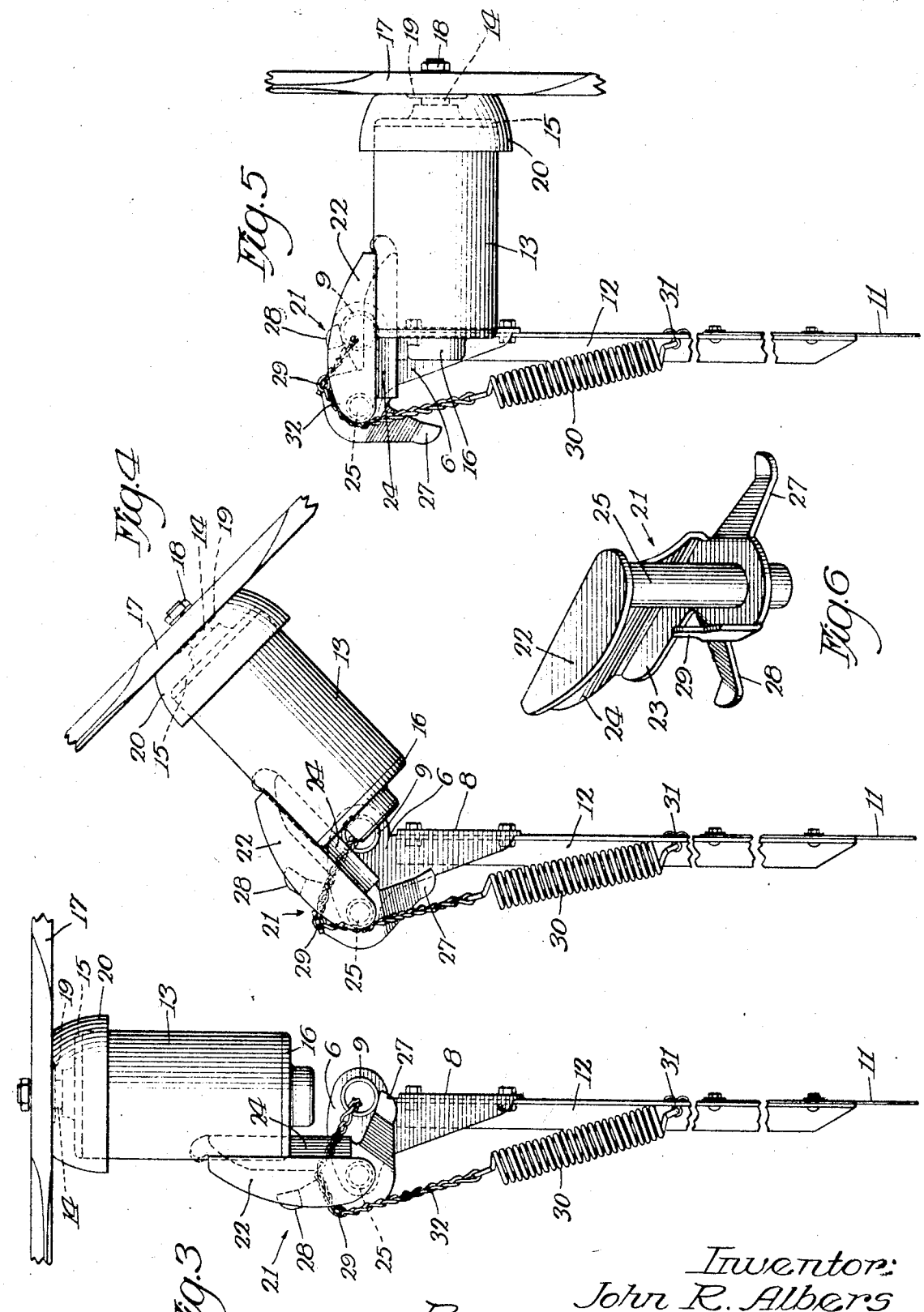
Inventor:
John R. Albers
By J. Clarke Hagey Atty.

Patented July 16, 1940

2,207,964

UNITED STATES PATENT OFFICE 2,207,964

WIND DRIVEN POWER APPARATUS

John R. Albers, Sioux City, Iowa, assignor to Wincharger Corporation, Sioux City, Iowa, a corporation of Minnesota Application March 17, 1938, Serial No. 196,470

9 Claims. (Cl. 170—46)

This invention relates to wind driven power apparatus of the type employed upon farms and ranches for utilizing the power of the wind to drive other mechanisms, such as pumps and electric generators, and more particularly concerns apparatus of this character which operates upon variations in the force of the wind to vary the angle of the plane of rotation of the wind driven impeller with respect to the direction of the wind and thus automatically govern the rotative speed of the apparatus.

One of the objects of the invention is to provide a construction in which, under normal operating conditions, the wind driven impeller will be yieldingly held to squarely face the wind and thus receive maximum driving power therefrom under normal and less than normal wind conditions. Another object is to provide a construction in which, under normal operating conditions, the horizontal axis of the impeller will be held in alignment with the vertical axis upon which the apparatus is turned by the steering tail-vane thereof, thereby stabilizing the directional positioning of the apparatus in the wind stream and avoiding the continuous and erratic vacillations thereof often observable in the operation of apparatus of this character, even under steady directional wind conditions, which results in loss of power and unnecessary wear of the bearings. Another object is to provide a construction in which, due to the aforesaid directional stabilization of the apparatus in holding the wind driven impeller to squarely face the wind, variations in the force of the wind are more directly effective upon the impeller, and the speed-governing action thereof may be more accurately adjusted and rendered more sensitive in operation. A further object of the invention is to provide a simple and sturdy construction which will accomplish the foregoing objects in a reliable manner.

In the drawings—

Figure 1 is a side elevational view of a wind driven power apparatus constructed according to this invention, major parts of the blades of the impeller and the legs of the supporting tower being broken away;

Figure 2 is a broken front elevational view, partly in section and upon an enlarged scale, taken upon the line 2—2 of Figure 1, illustrating certain details of the construction; and Figures 3, 4 and 5 are similar plan views of the upper parts of the apparatus shown in Figure 1, showing such parts, respectively, in fully operative, governing, and wholly inoperative positions.

Figure 6 is a detail view of the pivoted bracket for the generator casing.

While the invention is herein illustrated and described as applied to apparatus in which a two-bladed, high-speed wind driven impeller is mounted directly upon the rotor-shaft of an electric generator, it is by no means limited thereto, since all of the advantages provided by the invention are just as desirable when it is applied to other types of windmill constructions, regardless of the number of blades, size and speed of the wind driven impeller, and regardless of the kind of mechanism driven thereby. The simplicity and sturdiness of the construction is believed to be self-evident from the drawings, and the novel arrangement of the parts to produce the new and desirable results hereinbefore set forth will be easily understood and appreciated from the short description to follow:

Where an electric generator is to be directly driven by the wind driven impeller, as in the arrangement here shown, it has been found that the necessary high rotative speed is best obtained by using an impeller having blades few in number, low in pitch angle, and of small surface area. These and other refinements in design have resulted in providing remarkably high-speed impellers, but the very characteristics which render them highly efficient in this respect under normal wind velocities have the effect of greatly reducing their starting efficiency and also require that the speed be prevented from reaching dangerous extremes under abnormally high and gusty wind conditions. Centrifugally operating speed-governing devices have been employed for this purpose, but such devices have several objectionable features, among which are that they add inertia and further reduce starting efficiency; that their high-speed rotation is dangerous; and that loading a light-weight high-speed impeller with such apparatus places too great a strain upon it and upon the supporting structure as well. It has been learned from experience that, especially with high-speed and comparatively light-running wind driven power apparatus, more efficient and safer operation may be obtained by keeping the starting torque as low as possible and preventing excessive speeds by employing variations in the force of the wind to govern the angle of the plane of rotation of the impeller with respect to the direction of the wind. That is to say, with an impeller which, although it may be highly efficient when in operation, will not start easily in moderate or light winds, the load should be as light as practicable and the impeller should be steadily held to squarely face the wind, if satisfactory results are to be obtained under normal or sub-normal operating conditions. Then, to provide against excessive and dangerous speeds of the impeller and of the apparatus driven thereby under abnormally high wind velocities, rather than apply braking or retarding means to resist such excessive speeds, it has been found better to permit the impeller to yield bodily to the force of the wind thereupon and be swung back thereby so that the plane in which it rotates will be deflected more or less with respect to the direction of the wind, the angle of the deflection depending upon the force of the wind upon the impeller and the adjustment of the means which yieldingly resists such deflection. In this manner, the impeller is not subjected to excessive driving wind forces, and needless, useless and dangerous strains upon the impeller and upon the entire apparatus are avoided.

Referring, first, to Figure 1 of the accompanying drawings, 1 indicates the upper part of a supporting tower, having a split head-clamp 2; 3 is a hollow mast rigidly secured by head-clamp 2 and extending vertically upward from the top of tower 1; and 4 an annular flange or collar formed or otherwise fixed upon the upper end of mast 3, constituting the head-bearing upon which the turn-table 5 is rotatably supported. Turn-table 5 is herein shown as comprising a one-piece member formed with upper and lower plates 6 and 7, respectively, connected by a vertically extending web 8. A hollow main pivot-post 9 and an offset pivot-post 10 extend through and are rigidly fixed in plates 6 and 7, the main pivot-post 9 extending downwardly a considerable distance below lower plate 7, removably fitting within and turning freely in the hollow mast 3, and offset pivot-post 10 extending upwardly a considerable distance above upper plate 6 for purposes to be presently described. The usual steering tail-vane 11 is carried at the outer end-part of the horizontally extending tiller-arm 12, the inner end-part of which tiller-arm is riveted or bolted firmly to web 8 of turn-table 5. Lower plate 7 is shown as resting upon the head-bearing 4. With main pivot-post 9 rotatably inserted within the upper end-part of hollow mast 3 and lower plate 7 rotatably supported by head-bearing 4, the action of the wind upon tail-vane 11 will keep turn-table 5 so adjusted that pivot-post 10 will always be offset to the side of pivot-post 9 with respect to the direction of the wind.

The cylindrical casing of the electric generator is shown at 13, and the rotor-shaft 14 of the generator is supported in bearings in cap-plates 15 and 16 of the casing. Preferably, cap-plate 16 closes the rearward end of the casing and encloses the rearward end of the rotor-shaft and the bearing therefor. The forward end-part of rotor-shaft 14 extends through the bearing in cap-plate 15 and carries the wind driven impeller 17 keyed or otherwise fixed thereupon and secured by the nut 18. A thrust bearing-plate 19 is secured upon rotor-shaft 14 and to the rearward face of impeller 17, and the forward end of casing 13, the cap-plate 15 with the shaft-bearing therein, and the plate 19 are all weather-shielded by the annular flange of the cup 20, which turns with the impeller 17 and extends rearwardly therefrom well over and about the forward end of casing 13.

Generator-casing 13 is supported upon a swinging bracket 21, herein shown as comprising a one-piece member formed with upper and lower plates 22 and 23, respectively, connected by a curved web 24. A vertically arranged tubular sleeve 25 is brazed, or otherwise rigidly secured, to plates 22 and 23, the upper end thereof being closed by plate 22 and the lower end projecting, as shown, below lower plate 23 and bearing upon upper plate 6 of turn-table 5. Generator-casing 13 fits against and is firmly secured, as by bolts 26, to the curved web 24. Bracket 21 also comprises a pair of stop-arms 27 and 28, which extend downwardly below lower plate 23 and project radially with respect to sleeve 25, and with an upwardly projecting hitch-post 29. As illustrated in Figures 2, 4 and 5 of the drawings, bracket 21 and generator-casing 13 swing over the top of main pivot-post 9 and stop-arms 27 and 28 extend downwardly from the body of the bracket and project radially from sleeve 25 to engage with the upper end-part of said pivot-post 9 to limit the swinging movement of the bracket and the parts supported thereby.

Attention is here directed to Figures 2 and 3, where it will be noted that stop-arm 27 is in engagement with pivot-post 9, and the horizontal axis of rotor-shaft 14 is directly over the vertical axis of main pivot-post 9 and directly aligned with the tail-vane 11, and that, while this alignment is maintained, the impeller 17 will be positioned to squarely face the wind and therefore develop maximum power efficiency therefrom. Bracket 21 and the parts supported thereby are yieldingly held in the positions just mentioned by the action of a spring 30, one end of which is secured, as at 31, to the tiller-arm 12 and the other end of which is secured by a flexible connection, such as the chain 32, to the hitch-post 29. The tension of spring 30 may be adjusted by hooking different links of the chain over the hitch-post, and the chain extends from the hitch-post over to the hollow pivot-post 9 and downwardly through pivot-post 9 and hollow mast 3 for manual operation. A downward pull upon the lower end of the chain 32 will turn bracket 21 upon offset pivot-post 10 until stop-arm 28 engages main pivot-post 9, so that the wind driven impeller 17 is turned out of the wind and into the inoperative position shown in Figure 5. The apparatus may be held in this inoperative position by securing the lower end of the chain in the customary manner, and, upon release of the chain, spring 30 will act to swing bracket 21 back again until stop-arm 27 engages main pivot-post 9 and the impeller is returned to the fully operative position shown in Figure 3 and already described.

Wheel-deflecting windmill governing arrangements have been in use for many years, and in many of such arrangements the horizontal wheel-shaft is carried upon a horizontally swinging support to permit the wind-wheel to be deflected by the force of the wind thereupon for the purposes herein described, but, in such arrangements, the wheel-shaft has been offset to the side of the vertical turning axis of the apparatus, so that the wind-wheel, or wind driven impeller, cannot be held by the tail-vane to squarely face the wind. That is to say, in such previous arrangements, the force of the wind upon the offset impeller deflects the tail-vane somewhat out of the wind stream, and there exists a continuous and erratic vacillation or weaving of the apparatus, the action of the wind upon the steering tail-vane "fighting" the action thereof upon the offset impeller, resulting in a considerable loss of power and unnecessary wear upon the bearings.

According to the present invention, so long as the force of the wind upon the impeller 17 is insufficient to overcome the resistance of spring 30, the parts will be maintained in their fully operative positions, and, the rotor-shaft 14 being directly aligned with the vertical turning axis of turn-table 5 and with the steering tail-vane 11, the impeller will be held by the action of the wind upon the tail-vane to squarely face the direction of the wind. With such centralized arrangement, there will be no tendency for the action of the wind upon the impeller to swing the tail-vane out of the wind stream; there will be no structural cause for vacillating or weaving action of the apparatus; the end-thrust of the rotor-shaft will be direct, so that there will be no side pressure and wear of the shaft upon its bearings; and the impeller will be 100 per cent efficient in starting and in developing driving power. With the impeller thus steadily held to squarely face the wind, it will receive the full effect thereof equally over the full diameter of the plane of its rotation, so that it will not only develop its maximum driving power but will be highly sensitive to variations in the force of the wind and therefore subject to more accurate and dependable regulation, whereby the automatic governing of its rotative speed may be nicely predetermined by adjustment of the tension of the resisting spring 30. When and as the force of the wind upon the impeller overcomes the resistance of the spring, the spring, in yielding thereto, will increase in resistance as it is stretched, and the impeller will be blown backwardly, swinging the bracket 21 upon offset pivot-post 10 until the impeller has been deflected sufficiently to decrease the horizontal diameter of the plane of its rotation with respect to the direction of the wind, thus lessening the deflecting as well as the driving force of the wind thereupon. As the deflecting force of the wind upon the impeller is thus lessened and the resisting power of the spring is increased, the deflected position of the impeller will be that at which these forces balance. When the impeller squarely faces the wind (Figure 3), its power efficiency is 100 per cent, and when it is turned edgewise to the wind (Figure 5), its power efficiency is zero. Consequently, when deflected between these extreme positions, its power efficiency varies in accordance with the degree of deflection.

From the foregoing description, it will be evident that governing of the rotative speed of the apparatus may be automatically effected without subjecting the impeller or any other part of the apparatus to violent and dangerous wind driving strains.

I claim:

1. In apparatus of the class described, the combination, with a fixed support, a turn-table supported thereupon to rotate about a vertical axis, and a wind-vane carried upon said turn-table, of a member pivotally mounted upon said turn-table for horizontal swinging movement, a horizontal shaft carried upon said member and movable by the swinging movement thereof into and from a position in which the axis of said shaft occupies the same vertical plane as the axis about which said turn-table rotates, the pivotal mounting of said member upon said turn-table being offset with respect to the axis about which said turn-table rotates and with respect to the axis of said shaft, a wind driven impeller secured upon said shaft for driving the same, and means acting upon said member to yieldingly resist the swinging movement thereof in one direction and thereby oppose the movement of said shaft from said position.

2. In apparatus of the class described, the combination, with a fixed support, a turn-table supported thereupon to rotate about a vertical axis, and a wind-vane carried upon said turn-table and extending radially therefrom with respect to the axis about which said turn-table rotates, of a member pivotally mounted upon said turn-table for horizontal swinging movement, a horizontal shaft carried upon said member and movable by the swinging movement thereof into and from a position in which the axis of said shaft occupies the same vertical plane as said wind-vane, the pivotal mounting of said member upon said turn-table being offset with respect to the vertical plane occupied by said wind-vane and with respect to the axis of said shaft, a wind driven impeller secured upon said shaft for driving the same, and means acting upon said member to yieldingly resist the swinging movement thereof in one direction and thereby oppose the movement of said shaft from said position.

3. In apparatus of the class described, the combination, with a fixed support, a turn-table supported thereupon to rotate about a vertical axis, and a wind-vane carried upon said turn-table and extending radially therefrom with respect to the axis about which said turn-table rotates, of a member pivotally mounted upon said turn-table for horizontal swinging movement, a horizontal shaft carried upon said member and movable by the swinging movement thereof into and from a position in which the axis of said shaft occupies the same vertical plane as the axis about which said turn-table rotates and as that occupied by said wind-vane, the pivotal mounting of said member upon said turn-table being offset with respect to the axis about which said turn-table rotates, with respect to the vertical plane occupied by said wind-vane, and with respect to the axis of said shaft, a wind driven impeller secured upon said shaft for driving the same, and means acting upon said member to yieldingly resist the swinging movement thereof in one direction and thereby oppose the movement of said shaft from said position.

4. In apparatus of the class described, the combination, with a fixed support, a turn-table supported thereupon to rotate about a vertical axis, and a wind-vane carried upon said turn-table, of a member pivotally mounted upon said turn-table for horizontal swinging movement, a horizontal shaft carried upon said member, stop means effective to limit the horizontal swinging movement of said member in one direction to a first position in which the axis of said shaft occupies the same vertical plane as the axis about which said turn-table rotates, and in the opposite direction to a second position in which the axis of said shaft is substantially at a right angle to said first position thereof, the pivotal mounting of said member upon said turn-table being offset with respect to the axis about which said turn-table rotates and with respect to the axis of said shaft, a wind driven impeller secured upon said shaft for driving the same, and means acting upon said member to yieldingly resist the swinging movement thereof in said opposite direction toward said second position.

5. In apparatus of the class described, the combination, with a fixed support, a turn-table supported thereupon to rotate about a vertical axis, and a wind-vane carried upon said turn-table and extending radially therefrom with respect to the axis about which said turn-table rotates, of a member pivotally mounted upon said turn-table for horizontal swinging movement, a horizontal shaft carried upon said member, stop means effective to limit the horizontal swinging movement of said member in one direction to a first position in which the axis of said shaft occupies the same vertical plane as said wind-vane, and in the opposite direction to a second position in which the axis of said shaft is substantially at a right angle to the vertical plane occupied by said wind-vane, the pivotal mounting of said member upon said turn-table being offset with respect to the vertical plane occupied by said wind-vane and with respect to the axis of said shaft, a wind driven impeller secured upon said shaft for driving the same, and means acting upon said member to yieldingly resist the swinging movement thereof in said opposite direction toward said second position.

6. In apparatus of the class described, the combination, with a fixed support, a turn-table supported thereupon to rotate about a vertical axis, and a wind-vane carried upon said turn-table, of a member pivotally mounted upon said turn-table for horizontal swinging movement, a horizontal shaft carried upon said member, stop means effective to limit the horizontal swinging movement of said member in one direction to a position in which the axis of said shaft occupies the same vertical plane as the axis about which said turn-table rotates, means acting upon said member to move it into and yieldingly hold it and said shaft in said position, the pivotal mounting of said member upon said turn-table being offset with respect to the axis about which said turn-table rotates and with respect to the axis of said shaft, and a wind driven impeller secured upon said shaft for driving the same.

7. In apparatus of the class described, the combination, with a fixed support, a turn-table supported thereupon to rotate about a vertical axis, and a wind-vane carried upon said turn-table and extending radially therefrom with respect to the axis about which said turn-table rotates, of a member pivotally mounted upon said turn-table for horizontal swinging movement, a horizontal shaft carried upon said member, stop means effective to limit the horizontal swinging movement of said member in one direction to a position in which the axis of said shaft occupies the same vertical plane as said wind-vane, means connected with said wind-vane and acting upon said member to move it into and yieldingly hold it and said shaft in said position, the pivotal mounting of said member upon said turn-table being offset with respect to the vertical plane occupied by said wind-vane and with respect to the axis of said shaft, and a wind driven impeller secured upon said shaft for driving the same.

8. In apparatus of the class described, the combination, with a fixed support, a turn-table supported thereupon to rotate about a vertical axis, and a wind-vane carried upon said turn-table, of a member pivotally mounted upon said turn-table for horizontal swinging movement, energy transmitting means comprising a shaft, a casing enclosing said means and comprising bearings for the shaft thereof, a shaft for said means supported in the bearings of said casing, a wind driven impeller secured upon said shaft for driving the same, and means acting to yieldingly resist the swinging of said member in one direction upon its pivotal mounting upon said turn-table, said casing being rigidly secured upon said member and movable by the swinging movement thereof into and from a position in which the axis of said shaft will occupy the same vertical plane as the axis about which said turn-table rotates, the pivotal mounting of said member upon said turn-table being offset with respect to the axis about which said turn-table rotates and with respect to the axis of said shaft.

9. In apparatus of the class described, the combination, with a fixed support, a turn-table supported thereupon to rotate about a vertical axis, and a wind-vane carried upon said turn-table and extending radially therefrom with respect to the axis about which said turn-table rotates, of a member pivotally mounted upon said turn-table for horizontal swinging movement, energy transmitting means comprising a shaft, a casing enclosing said means and comprising bearings for the shaft thereof, a shaft for said means supported in the bearings of said casing, a wind driven impeller secured upon said shaft for driving the same, and means connected with said wind-vane and acting upon said member to yieldingly resist the swinging of said member in one direction upon its pivotal mounting upon said turn-table, said casing being rigidly secured upon said member and movable by the swinging movement thereof into and from a position in which the axis of said shaft will occupy the same vertical plane as said wind-vane, the pivotal mounting of said member upon said turn-table being offset with respect to the axis of said shaft and with respect to the vertical plane occupied by said wind-vane.

JOHN R. ALBERS.